United States Patent [19]

Wood

[11] Patent Number: 4,698,974
[45] Date of Patent: Oct. 13, 1987

[54] INTERNAL COMBUSTION CLOSED RANKINE CYCLE STEAM ENGINE

[75] Inventor: Palmer R. Wood, Paradise Valley, Ariz.

[73] Assignee: The Garrett Corporation, Los Angeles, Calif.

[21] Appl. No.: 681,161

[22] Filed: Dec. 13, 1984

[51] Int. Cl.⁴ .................................................. F01K 21/00
[52] U.S. Cl. ............................. 60/673; 60/649; 60/668
[58] Field of Search .................... 60/649, 673, 668

[56] References Cited

U.S. PATENT DOCUMENTS 2,706,890  4/1955  Schmidt .......................... 60/649
3,101,592  8/1963  Robertson et al. .
3,975,913  8/1976  Erickson .......................... 60/671

Primary Examiner—Allen M. Ostrager
Attorney, Agent, or Firm—Terry L. Miller; Albert J. Miller

[57] ABSTRACT

Disclosed is a steam engine which is used to propel underwater vehicles without exhausting combustion products to the surrounding water. A solid metallic fuel reacts in a first chamber with water to produce hydrogen which is subsequently reacted in a second chamber with oxygen to produce heat and water. The amount of water produced in the second chamber is equal to the amount of water used in the first chamber. Consequently, no excess water is produced.

9 Claims, 1 Drawing Figure

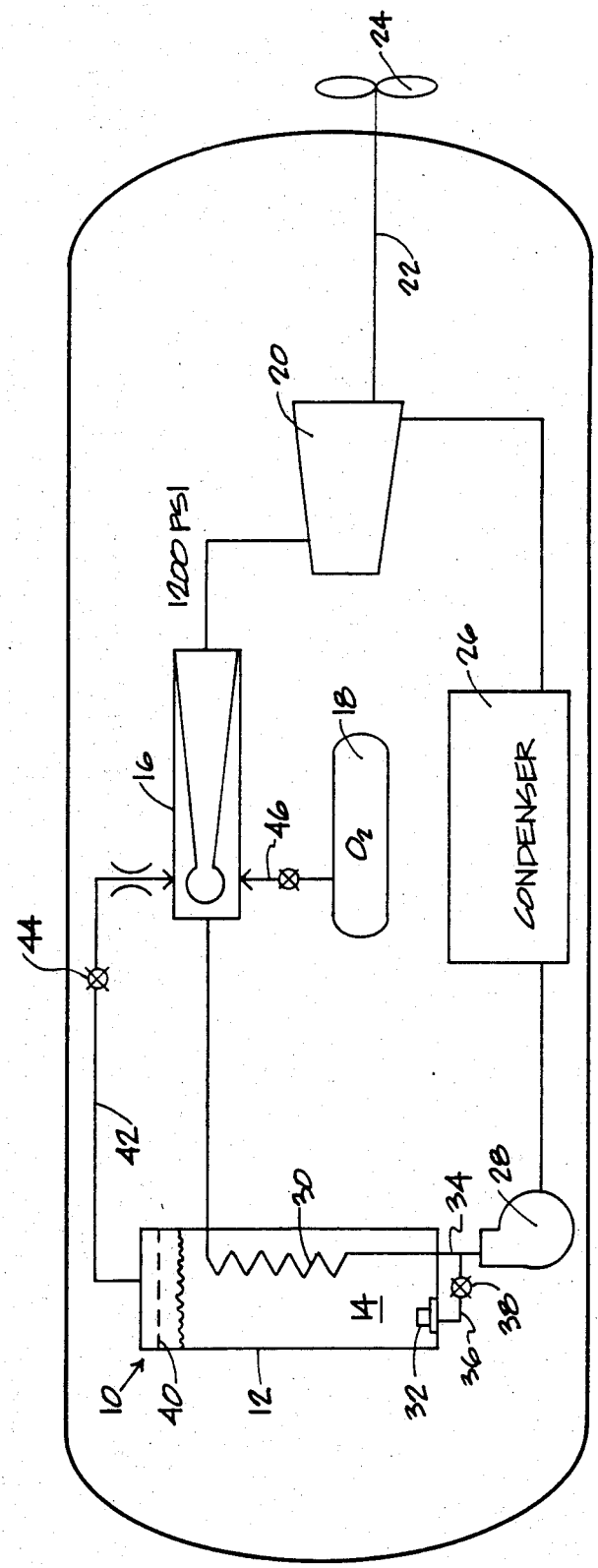

INTERNAL COMBUSTION CLOSED RANKINE CYCLE STEAM ENGINE

BACKGROUND OF THE INVENTION

1. Field of the Invention

This invention relates to steam engines, and particularly to an internal combustion, closed rankine cycle, steam engine used to propel vehicles.

2. Background Discussion

The objective of the present invention is to provide a engine which can be used with vehicles and the like that will propel these vehicles with no exhaust. It is also an objective of this invention to provide such an engine with high specific power to weight and power to volume ratios. This is highly desirable, particularly high specific power to volume ratios, because then the vehicle will have either a greater range or will travel at a higher rate of speed, depending on the design of the vehicle.

U.S. Pat. No. 3,101,592 discloses an internal combustion, closed rankine cycle steam engine which has a high specific power to weight and power to volume ratios, but has the disadvantage of using fuels which at the completion of the combustion cycle yield an excess of water. This water must be either stored in the vehicle or exhausted, which would frustrate the objective of eliminating exhaust. In accordance with the present invention, this type of engine has now been improved so that the problem of excess water is eliminated.

THE INVENTION

The steam engine of this invention is of a closed cycle type wherein the steam is never exhausted from the vehicle. The steam produced is used to drive a turbine which turns the propeller of the vehicle and this steam is then condensed and recycled. In accordance with this invention, a fuel is employed which does not produce any excess water.

The engine of this invention employs a novel method of producing super heated steam, which comprises the following steps:

(a) reacting water with a fuel in the absence of oxygen in a first reaction zone to produce hydrogen and heat, (b) heating water using the heat produced in step (a) to produce steam, and (c) reacting the hydrogen produced in step (a) with oxygen in a second reaction zone separate from that of step (a) in the presence of the steam produced in step (b) to produce the desired superheated steam in an amount substantially equal to the amount of water used in step (a).

The advantages of this invention are:

1. There is no exhaust detection through an exhaust.
2. There is a more efficient transfer of heat produced by the reaction of water with the fuel.
3. The oxygen used to react with the hydrogen may be stored in either solid, liquid, or gaseous form.
4. The reactions are carried out in two separate reaction zones thus providing greater control of the reactions.
5. The working fluid, the steam, used to drive the turbine engine is constantly recycled, providing greater efficiency and ease of handling.
6. When solid metallic fuels are used, they are essentially immediately converted to the molten state thereby facilitating heat transfer to the steam or working fluid.
7. The heat exchangers employed in the engine are substantially lighter weight because of the ability to control internal engine pressures.
8. The temperature of the inlet steam to the turbine can be as high as the turbine components will tolerate. Thus, high turbine efficiency is obtained, providing the desired high specific power to weight and power to volume ratios.

BRIEF DESCRIPTION OF THE DRAWING

The FIGURE is a schematic illustration of the steam engine of this invention.

DETAILED DESCRIPTION OF THE DRAWING

The steam engine 10 of this invention is an internal combustion engine employing a closed rankine cycle. It has the following major components:

A first reaction chamber 12 which holds a solid fuel 14, a second reaction chamber 16 where the hydrogen produced in the first reaction chamber is mixed with oxygen stored in a high pressure vessel 18, a turbine 20, which has its drive shaft 22 attached to a propeller 24, a condenser 26 which includes a chamber holding the water which is cycled by a pump 28 through a heat exchanger 30 associated with the first reactor, and an injector 32 which injects water into the first reactor to react this water with the fuel 14 contained in the reactor.

The reaction chamber 12 also includes, at its upper end, a filter 40 which will filter out any particles of metal or the like which may clog downstream lines and equipment. The reaction chamber 12 is shown a holding the heat exchanger 30. The heat exchanger 30 could, however, be placed outside the chamber. But this would not be the most efficient way to employ the heat exchanger 30, as will be appreciated upon further reading. Because of the internal pressures of the system, the walls of the heat exchanger may be relatively thin to result in a more efficient transfer of heat, a less costly heat exchanger, and a more efficient compact engine.

In accordance with one feature of this invention, the solid fuel 14 is first converted to a molten state by the use of any suitable heat source, for example, aluminum potassium perchlorate ($Al$-$KClO_4$) flare mixtures. The water contained within the condensor 26 is fed by the pump 28 through line 34 into the inlet end of the heat exchanger 30. There is a branch line 36, including a valve 38 which leads to the injector 32 which, when the valve is opened, injects water directly into the reaction chamber 12. This water fed directly into the reaction chamber 12 reacts with the fuel 14 to produce hydrogen and heat. The fuel 14 employed will not produce more hydrogen than the hydrogen associated with the water being reacted with the fuel. Thus, when the hydrogen produced in the chamber 12 reacts with the oxygen in chamber 16, the amount of water formed equals the amount fed into chamber 12. Thus, a material balance is maintained, avoiding production of excess water.

The water flowing through the heat exchanger 30 is converted to steam by the heat produced in the reaction chamber 12. The hydrogen produced from the reaction of the water with the fuel exits the reaction chamber through an outlet line 42 which includes a valve 44 for controlling the flow of this hydrogen into the inlet end of the second reaction chamber 16. This second reaction chamber is of the type commonly referred to as an Aphoid combustor. Oxygen stored in a suitable vessel 18 under pressure is fed through a valved line 46 into the second reaction chamber 16 simultaneously with the introduction of hydrogen into this chamber. In addition to introducing hydrogen and oxygen into the chamber 16, the working fluid or steam coming from the outlet end of the heat exchanger 30 flows into the second reaction chamber and serves to act as a medium for controlling the temperature produced in the second reaction chamber. In other words, the steam acts as a quench gas which can lower the temperature produced in the second reaction chamber. The hydrogen and oxygen will react to produce additional steam which combined with the steam from the heat exchanger 30 flows out the reaction chamber 16 as superheated steam and into the inlet end of the turbine 20. Because the pressure within the second reaction chamber is approximately the same as the pressure in the first reaction chamber, the differential pressure across the walls of the heat exchanger 30 is relatively low. This enables the heat exchanger to be made of thin walls.

The superheated steam exiting chamber 16 is at elevated pressure and temperature and it drives the blades of the turbine 20 which in turn turns the propeller 24. The energy liberated by the steam in driving the turbine results in the temperature of the steam being lowered. This steam is then forwarded to the condensor 26 which converts it to water which is then recycled to the heat exchanger. Since no excess water is produced, this water from the turbine is simply recycled through the system.

The engine operation is based upon obtaining heat through chemical reactions to provide steam at elevated temperature and pressure for use in driving the turbine 20 to provide the mechanical power to turn the propeller 24. The fuel preferably is a solid metallic material, which upon reacting with water, will produce hydrogen and heat. Metals such as sodium, magnesium, lithium, aluminum and mixtures thereby are typically used. Preferably, an equal molal mixture of aluminum and lithium are used. These metals are highly reactive materials which will produce the hydrogen and heat and, if there is any oxygen present, will immediately result in the reaction of hydrogen and oxygen to produce water with explosive force. Consequently, the first reaction chamber 12 is sealed so that no oxygen will enter this chamber when water is reacting with the fuel. The following formula illustrates the chemical reactions occurring:

$$Li + Al + 2H_2O \rightarrow 2H_2 + LiAlO_2 + 4302 \text{ BTU} \qquad (1)$$

$$2H_2 + O_2 \rightarrow H_2O + 5775 \text{ BTU} \qquad (2)$$

The following is an analysis of the heat release based upon one pound of water used in the first reaction chamber 12. To start the reaction, the lithium must first be melted using a high heat release source such as a mono-propellant. Upon injection of the water, the following reaction will take place:

$$2Li + 2H_2O \rightarrow H_2 + 2 LiOH + 3633 \text{ BTU}$$

The liberation of heat resulting from the reaction of water with lithium will melt the aluminum and will provide a molten bath of aluminum and lithium. By controlling the rate at which water is introduced into the first reaction chamber 12, one will be able to control the temperature. Assuming that the water is controlled so that the temperature of the reaction is 1400° F., the analysis of the heat produced is as follows:

In accordance with equation (1), one pound of water will react with 0.193 pound of lithium and 0.749 pound of aluminum to provide 0.112 pound of hydrogen gas and 1.83 pounds of lithium aluminum oxide ($LiAlO_2$) plus 8,355 British thermal units (BTU). The lithium aluminum oxide has a melting temperature of over 2900° F. and is insoluble in water. Consequently, it will precipitate in the reaction chamber 12. The heat required to raise one pound of water from 60° F. to 1400° F. at 1,000 PSI is 1,702 BTU. Thus, the net heat available to heat the water to produce steam is 8,355 minus 1,702 BTU or 6,653 BTU.

To continue the analysis based upon the reactions occurring according to equation (2), the 0.112 pound of hydrogen will react with 0.888 pound of oxygen to form 1.0 pound of water plus 5,775 British thermal units of heat. Assuming the oxygen is stored cryogenically at −279° F. and 1,000 psia, at least the heat of vaporization can be provided by the exhaust of the steam from the turbine 20. This requires 2,934 BTU per pound of oxygen. Heat required to raise 0.888 a pound of oxygen to 1,600° F. is 362 BTU [1,600−(−279)]×0.217×0.888. The heat required to raise 0.112 pound of hydrogen from 1400° F. to 1600° F. is 77 BTU's. Thus, the net heat available to transfer to the water working fluid in the second reactor is 5335 BTU and the total heat available to the water working fluid is 11,988 BTUs. With the steam temperature of 1600° F. at 1000 psia, 1817 BTUs are required for each pound of working medium. Therefore, the water flow required for heat balance is 11,988 divided by 1,817 or 6.60 pounds. When the one pound of steam formed by the hydrogen/oxygen reaction in the second reactor is added to this value, the total steam flow to the power conversion expander is 7.60 pounds at 1600° F. at 1,000 psia.

The total heat added from both reactions is thus 1,817×7.6 or 13,803 BTU. Since the one pound of water used for reaction in the first reactor is returned to the water storage vessel, the thermal energy available per pound of reactants used in terms of kilowatt hours per pounds (KW-Hr/Lb) is 2.21. In terms of kilowatt hour per cubic foot of fuel, the thermal energy per cubic foot of reactants is 180.

The above analysis has been provided simply for illustration purposes and other steam temperatures and pressures may be selected dependant upon different application requirements.

SCOPE OF THE INVENTION

The above description presents the best mode contemplated of carrying out the present invention as depicted by the disclosed embodiment. The combination of features illustrated by this embodiment provides the advantages of this invention as enumerated above. This invention is, however, susceptible to modifications and alternate constructions from the embodiments shown in the drawing and described above. Consequently, it is not the intention to limit it to the particular embodiment disclosed. On the contrary, the intention to cover all modifications and alternate constructions falling within the scope of the invention as generally expressed by the following claims.

I claim:

1. An internal combustion, closed rankine cycle, steam engine, including
   turbine means,
   first container means holding water,
   second container means holding oxygen,
   a first reaction chamber containing fuel means for reaction with water to produce heat and hydrogen, the latter of an amount equal to the amount of hydrogen in the water reacting with the fuel; said first reaction chamber being sealed so that oxygen does not enter said first chamber during the formation of hydrogen,
   heat exchanger means adapted to have water passing therethrough,
   said heat exchanger means being coupled to the first reaction chamber so that the heat produced therein heats the water passing through the heat exchanger and converts it to steam,
   means for feeding water from the first container means into the first reaction chamber to contact the fuel therein and for feeding water through the heat exchanger means,
   second reaction chamber means wherein the steam and hydrogen from the first reaction chamber means are mixed with oxygen from the second container means to produce superheated steam,
   means for feeding the superheated steam from the second reaction chamber to the turbine means, thereby driving the turbine means to produce power,
   means for cooling the steam from the turbine means to provide a phase change from steam to water, and
   means for recycling the water from the turbine means to the first container means,
   said fuel means composed of essentially equal molar quantities of metallic aluminum and metallic lithium.

2. The engine of claim 1 comprising means for feeding water through the heat exchanger means and into the first reaction chamber means simultaneously.

3. The engine of claim 1 wherein the fuel is in the molten state.

4. The engine of claim 1 wherein valve means are provided for controlling the flow of fluids through the engine.

5. A method of producing superheated steam, comprising
   (A) reacting water with a fuel in the absence of oxygen to produce hydrogen and heat,
   (B) heating water using the heat from Step (A) to produce steam,
   (C) reacting the hydrogen produced in Step (A) in a separate reaction chamber with oxygen in the presence of the steam produced in Step B to produce said superheated steam in an amount substantially equal to the amount of water used in Step A, and
   (D) utilizing substantially equal molar quantities of metallic aluminum and metallic lithium as said fuel.

6. The method of claim 5 wherein the fuel is utilized in a molten state.

7. Closed propulsion apparatus comprising a store of water; a supply of fuel composed substantially of equal molar amounts of metallic lithium and metallic aluminum; means for controllably introducing water from said store into said fuel for reaction therewith in the absence of free oxygen to produce free hydrogen and heat; heat exchange means for receiving water from said store and heat from said water-fuel reaction and converting said water to steam; a source of oxygen; combustion chamber means for receiving said free hydrogen, said steam, and oxygen from said source to maintain combustion producing pressurized superheated steam; an expander for extracting mechanical work from said superheated steam and exhausting spent steam, condenser means for receiving said spent steam and converting same to water in water-balance relation with water supply from said store to said fuel; means for conveying water from said condenser means to said water store.

8. The invention of claim 7 wherein said expander means comprises a steam turbine.

9. The method of propelling a vehicle, said method comprising the steps of:
   (a) reacting water with a fuel composed essentially of equal molar quantities of metallic lithium and metallic aluminum to produce heat and free hydrogen;
   (b) utilizing the heat produced from step (a) to vaporize water to steam;
   (c) combining oxygen with the free hydrogen from step (a) to maintain combustion producing superheated steam;
   (d) utilizing the steam produced by step (b) to control the temperature the superheated steam of step (c);
   (e) driving a mechanical power converter to product shaft powder from the tempered steam of step (d) while exhausting spent steam;
   (f) condensing said spent steam to water in water-balance relation with the quantity of water utilized in step (a).

* * * * *